United States Patent Office 3,110,702
Patented Nov. 12, 1963

3,110,702
MOLECULAR WEIGHT CONTROL IN POLYMERIZATION OF VINYLIDENE MONOMERS
Richard E. Delacretaz, Springfield, Mass., assignor to Monsanto Chemical Company, St. Louis, Mo., a corporation of Delaware
No Drawing. Filed Nov. 23, 1959, Ser. No. 854,550
7 Claims. (Cl. 260—85.5)

This invention relates to vinylidene polymers having improved processability. More particularly, the invention relates to means for controlling the molecular weights of polymers produced by the polymerization of certain vinylidene monomers so as to improve the processability of the polymers.

One object of this invention is to provide vinylidene polymers having improved processability.

Another object is to provide means for controlling the molecular weights of polymers produced by the polymerization of certain vinylidene monomers.

These and other objects are attained by polymerizing a vinylidene monomer of the group consisting of monovinylidene aromatic hydrocarbons containing a single aromatic nucleus, alkyl acrylates, alkyl methacrylates, acrylonitrile, methacrylonitrile, and mixtures thereof in the presence of 0.01–10% by weight, based on the weight of vinylidene monomer, of a 1,1-diarylethylene.

The following examples are given to illustrate the invention. Parts and percentages mentioned are parts and percentages by weight.

*Example I*

A suitable reaction vessel is charged with 70 parts of styrene, 30 parts of arylonitrile, and 0.05 part of diisopropylbenzene peroxide. The vessel is sealed, and its contents are heated at 120° C. for 4 hours and then at 130° C. for 16 hours. The product of the reaction is purified by dissolving it in methyl ethyl ketone and then precipitating it in methanol. The purified product is a styrene-acrylonitrile copolymer having a specific viscosity of 0.174, measured as a solution of 0.1% of the polymer in dimethylformamide.

*Example II*

Example I is repeated with the exception that 0.5 part of 1,1-diphenylethylene is included in the charge to the reaction vessel. The purified product of the reaction is a styrene-acrylonitrile copolymer containing chemically-combined 1,1-diphenylethylene and having a specific viscosity of 0.135, measured as a solution of 0.1% of the polymer in dimethylformamide.

*Example III*

Example I is repeated with the exception that 1 part of 1-phenyl-1-tolylethylene is included in the charge to the reaction vessel. The purified product of the reaction is a styrene-acrylonitrile copolymer containing chemically-combined 1-phenyl-1-tolylethylene and having a specific viscosity of 0.126, measured as a solution of 0.1% of the polymer in dimethylformamide.

*Example IV*

One hundred parts of water, 70 parts of styrene, 30 parts of acrylonitrile, 0.03 part of di-t-butylperoxide, 0.75 part of 1,1-diphenylethylene, and 0.03 part of a suspending agent consisting of a copolymer of acrylic acid and 2-ethylhexylacrylate are charged to a suitable reaction vessel with agitation, deoxygenated, and heated under inert gas pressure, first at 128° C. for 4 hours, then at 138° C. for 3 hours, and finally at 145° C. for 1 hour. The bead slurry is stripped of unreacted monomers, washed, and dried. The product is a styrene-acrylonitrile copolymer containing chemically-combined 1,1-diphenylethylene and having a specific viscosity of 0.09, measured as a solution of 0.1% of the polymer in dimethylformamide.

*Example V*

A solution of 1 part of sodium stearate in 133 parts of water is charged to a suitable reaction vessel with agitation and then deoxygenated. Then 5 parts of a solution of 0.25 part of potassium persulfate in 67 parts of water and 5 parts of a mixture of 77 parts of styrene, 20 parts of acrylonitrile, and 2 parts of 1,1-diphenylethylene are added to the aqueous soap solution. During the following 3-hour period, the remainder of the catalyst solution and the remainder of the monomer mixture are separately and continuously added to the aqueous soap solution, while the batch is allowed to reflux at atmospheric pressure through a water-cooled condenser. Heating is continued for an additional 30 minutes, and then the batch is stripped of unreacted monomers. The product is a styrene-acrylonitrile copolymer containing chemically-combined 1,1-diphenylethylene and having a specific viscosity of 0.1, measured as a solution of 0.1% of the polymer in dimethylformamide.

*Example VI*

Suitable reaction vessel is charged with 100 parts of styrene, 0.2 part of benzoyl peroxide and 0.02 part of t-butyl peracetate. The vessel is purged with nitrogen and sealed, and its contents are heated in an inert atmosphere at 90° C. for 6.5 hours and then at 120° C. for 3 hours. The product of the reaction is purified by dissolving it in methyl ethyl ketone and then precipitating it in methanol. The purified product is polystyrene having a Staudinger average molecular weight of 47,500.

*Example VII*

Example VI is repeated with the exception that 0.1 part of 1,1-diphenylethylene is included in the charge to the reaction vessel. The purified product of the reaction is polystyrene having a Staudinger average molecular weight of 43,350.

*Example VIII*

A suitable reaction vessel is charged with 100 parts of methyl methacrylate, 0.5 part of benzoyl peroxide, and 0.02 part of t-butyl peracetate. The vessel is purged with nitrogen and sealed, and its contents are heated in an inert atmosphere at 80° C. for 5 hours and then at 120° C. for 3 hours. The product of the reaction is purified by dissolving it in methyl ethyl ketone and then precipitating it in methanol. The purified product is methyl methacrylate polymer having a specific viscosity of 0.123, measured as a solution of 0.1% of the polymer in dimethylformamide.

*Example IX*

Example VIII is repeated with the exception that 0.1 part of 1,1-diphenylethylene is included in the charge to the reaction vessel. The purified product of the reaction is methyl methacrylate polymer containing chemically-combined 1,1-diphenylethylene and having a specific viscosity of 0.061, measured as a solution of 0.1% of the polymer in dimethylformamide.

The invention is a means for controlling the molecular weights of vinylidene polymers by polymerizing one or more of certain vinylidene monomers in the presence of a 1,1-diarylethylene.

The 1,1-diarylethylenes utilizable in the practice of this invention are compounds corresponding to the formula:

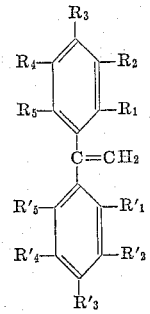

wherein $R_1$, $R_5$, $R'_1$, and $R'_5$ represent the same or different members of the group consisting of hydrogen, halogen, —$CH_3$, and —$OCH_3$ and wherein $R_2$, $R_3$, $R'_4$, $R'_2$, $R'_3$, and $R'_4$ represent the same or different members of the group consisting of hydrogen, halogen, alkyl radicals containing 1–10 carbon atoms, and alkoxy radicals containing 1–10 carbon atoms. Suitable 1,1-diarylethylenes include 1,1-diphenylethylene, 1-phenyl-1-tolylethylene, 1,1-bis(o-methylphenyl)ethylene, alpha - (o-chlorophenyl)styrene, alpha-(3,4-diethylphenyl)-p-hexoxystyrene, alpha-(p-decylphenyl)styrene, alpha - (2,3,4 - trimethylphenyl)-o-bromo-p-propylstyrene, alpha-(3,4-dibutoxyphenyl)-2,3,4-trichlorostyrene, etc. The amount of 1,1-diarylethylene utilized is in the range of 0.01–10% by weight, preferably 0.1–5%, based on the weight of the vinylidene monomer or monomers being polymerized.

Vinylidene monomers which are polymerized in the presence of 1,1-diarylethylenes in accordance with this invention are compounds of the group consisting of monovinylidene aromatic hydrocarbons containing a single aromatic nucleus, e.g., styrene, alpha-methylstyrene, alpha-ethylstyrene, o-, m-, and p-methylstyrenes, o-, m-, and p-methyl-alpha-methylstyrenes, p-isopropylstyrene, ar-dibutylstyrenes, vinyl naphthalene, etc.; polymerizable alkyl acrylates, e.g., methyl acrylate, ethyl acrylate, butyl acrylate, hexyl acrylate, 2-ethylhexyl acrylate, dodecyl acrylate, etc.; polymerizable alkyl methacrylates, e.g., methyl methacrylate, ethyl methacrylate, propyl methacrylate, butyl methacrylate, etc.; acrylonitrile, and methacrylonitrile. Mixtures of two or more of such compounds can be interpolymerized if desired. Also, one or more such compounds can be polymerized in the presence of up to about 50% by weight, based on the total weight of the polymerizable mixture, of one or more interpolymerizable ethylenically-unsaturated monomers, e.g., acrylic acid, methacrylamide, butadiene, etc. According to another embodiment of the invention, one or more of such vinylidene monomers can be polymerized in the presence of active vinylidene polymers, i.e., polymers capable of undergoing further reaction, to graft polymeric chains onto the chains of the preformed polymer. For example, a mixture of styrene, acrylonitrile, and 1,1-diphenylethylene can be added to a polybutadiene latex and polymerized to form a graft polymer in manner known to the art. The practice of the invention is particularly efficacious when at least one of the vinylidene monomers being polymerized is a polar compound.

Polymerization of the vinylidene compounds in the presence of 1,1-diarylethylenes is accomplished by any of the mass, suspension, or emulsion polymerization techniques already known to be useful in the polymerization of such vinylidene compounds. Such processes are conducted in batchwise or continuous manner, usually at temperatures in the range of 30–200° C. at atmospheric or superatmospheric pressure. Polymerization is usually catalyzed by a free radical-producing catalyst such as a peroxy or azo compound, but mass polymerization can be accomplished thermally in the absence of a catalyst, and emulsion polymerization can also be catalyzed by redox catalysts. The reaction mixture also contains ingredients such as emulsifying agents or suspending agents when such ingredients are required in the particular polymerization technique employed and may contain optional additives such as antioxidants, plasticizers, pigments, waxes, etc.

Polymerization of the vinylidene monomers in the presence of a 1,1-diarlyethylene results in the formation of polymers containing chemically-combined 1,1-diarylethylene and having lower molecular weights than the polymers formed under substantially the same conditions in the absence of a 1,1-diarylethylene. The lower molecular weight polymers have the particular advantages of better flow characteristics and ability to be processed at lower temperatures. Use of 1,1-diarylethylenes in accomplishing this molecular weight control has advantage over use of the mercaptans sometimes employed for the same purpose in that it avoids the objectionable odor problem associated with mercaptans.

It is obvious many variations may be made in the products and processes set forth above without departing from the spirit and scope of this invention.

What is claimed is:

1. In a process for polymerizing a polymerizable charge of the group consisting of (a) a vinylidene monomer of the group consisting of a monovinylidene aromatic hydrocarbon containing a single aromatic nucleus, a polymerizable alkyl acrylate, a polymerizable alkyl methacrylate, acrylonitrile, methacrylonitrile, and mixtures thereof and (b) mixtures of said vinylidene monomer with up to an equal amount by weight of a comonomer of the group consisting of acrylic acid, methacrylamide, butadiene, and mixtures thereof, the improvement which comprises lowering the molecular weight of the product by conducting the polymerization in the presence of 0.01–10% by weight, based on the weight of said vinylidene monomer, of a 1,1-diarylethylene corresponding to the formula:

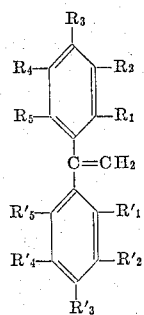

wherein each of $R_1$, $R_5$, $R'_1$, and $R'_5$ represents a member of the group consisting of hydrogen, halogen, —$CH_3$, and —$OCH_3$ and wherein each of $R_2$, $R_3$, $R_4$, $R'_2$, $R'_3$ and $R'_4$ represents a member of the group consisting of hydrogen, halogen, an alkyl radical containing 1–10 carbon atoms, and an alkoxy radical containing 1–10 carbon atoms; said polymerizable charge and said 1,1-diarylethylene being the only monomeric ingredients of the polymerization reaction mixture.

2. A process as in claim 1 wherein the 1,1-diarylethylene is 1,1-diphenylethylene.

3. A process as in claim 1 wherein the polymerization is conducted in the presence of 0.1–5% by weight of the 1,1-diarylethylene.

4. A process as in claim 1 wherein the vinylidene monomer is styrene.

5. A process as in claim 1 wherein the vinylidene monomer is a mixture of styrene and acrylonitrile.

6. A process as in claim 1 wherein the vinylidene monomer is methyl methacrylate.

7. A process as in claim 1 wherein said vinylidene monomer is the only component of the polymerizable charge which is polymerized in the presence of the 1,1-diarylethylene.

References Cited in the file of this patent

UNITED STATES PATENTS

| | | |
|---|---|---|
| 1,683,404 | Ostrowmislensky | Sept. 4, 1928 |
| 2,396,785 | Hanford | Mar. 19, 1946 |
| 2,583,325 | D'Alelio | Jan. 22, 1952 |
| 2,646,423 | Wehr | July 21, 1953 |
| 2,773,052 | Cohen et al. | Dec. 4, 1956 |